UNITED STATES PATENT OFFICE.

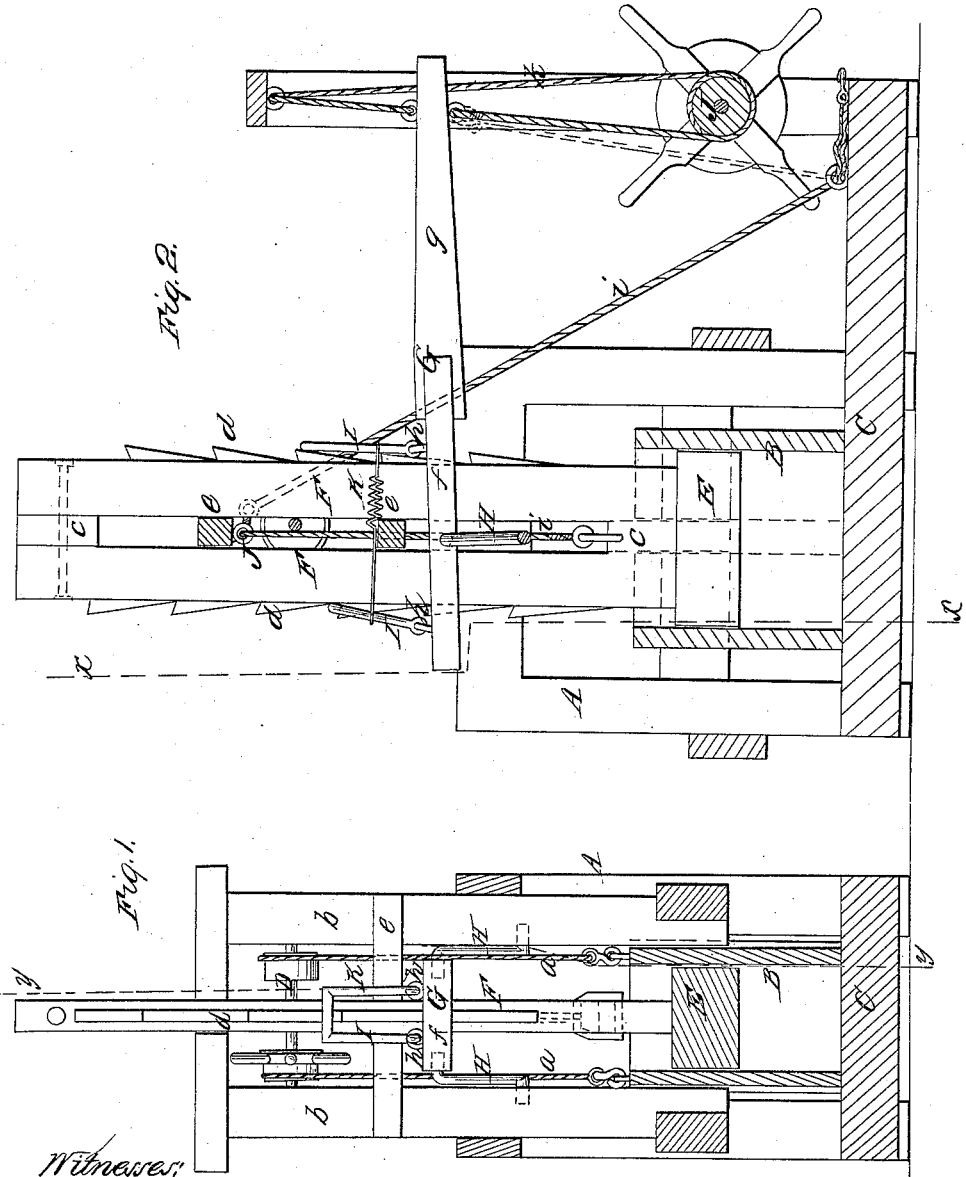

EDWARD C. BETTS, OF HUNTSVILLE, ALABAMA.

IMPROVEMENT IN PRESSES.

Specification forming part of Letters Patent No. 27,198, dated February 21, 1860.

*To all whom it may concern:*

Be it known that I, EDWARD C. BETTS, of Huntsville, in the county of Madison and State of Alabama, have invented a new and Improved Press, designed more especially for compressing cotton and other substances for baling; and I do hereby declare that the following is a full, clear, and exact description of the same, reference being had to the annexed drawings, making a part of this specification, in which—

Figure 1 is an end sectional view of my invention, taken in the line $x\,x$, Fig. 2; Fig. 2, a side sectional view of the same, taken in the line $y\,y$, Fig. 1.

Similar letters of reference indicate corresponding parts in the two figures.

The object of this invention is to obtain a simple, powerful, and economical press for the use of planters and farmers—one that may be operated by any convenient power and be capable of very general application—in fact, susceptible of being adapted for use in all cases where any of the known presses may be employed.

The invention consists in the employment or use of rack-bars, a lever provided with a movable fulcrum, and pawls or hooks, arranged and combined in a novel way for the purpose of giving the desired pressure.

The invention further consists in a peculiar arrangement of the press-box in connection with the levers and rack-bars aforesaid, whereby the cotton may not only be compressed with facility, but also readily removed from the press-box when compressed and bound in bale form.

To enable those skilled in the art to fully understand and construct my invention, I will proceed to describe it.

A represents a framing, which may be constructed in any proper way to support the working parts.

B is a press-box, which is placed on the base or bottom C of the framing. This press-box is of wood and may be made of any suitable dimensions, and it is allowed to rise and fall in the framing, the box being raised by ropes or chains $a\,a$, attached to its upper end and passing over a windlass, D, fitted between the upper parts of uprights $b\,b$ of the framing, as shown clearly in Fig. 1.

E is a follower, which is fitted in the press-box B, and to which bars F F are attached, with a space between the upper and lower ends of the bar F, through which and the bars F bolts pass to form a permanent connection. Each bar F has a rack, $d$, at its outer side, the form of the teeth of which is shown clearly in Fig. 2, and the uprights $b\,b$ are connected by traverse bars $e\,e$, which serve as guides to the bars F F, and prevent any unnecessary lateral working or play of the same. This will be fully understood by referring to Fig. 2.

G is a lever, which is formed of two parts, $f\,g$. The part $f$ of said lever is constructed of two bars with end pieces secured between them, to form an opening for the bars F F to work through. The part $g$ is a single piece, secured to the part $f$ in any suitable way. The fulcrum G of the lever is formed of two crank-shaped rods, H H, the lower ends of which are fitted in the uprights $b\,b$, and allowed to work and turn therein, the upper ends of said rods being fitted loosely on the sides of the part $f$ of the lever. The space between the two bars of the part $e$ of the lever is sufficiently long to admit of a requisite degree of vibration of said lever.

To the upper surface of the part $f$ of the lever G there are attached two pawls or hooks, I I, which are connected to said lever by joints $h\,h$. These hooks are placed one at the outer side of each bar F, and quite near to the bars, for the purpose hereinafter described.

To the lower block, $c$, of the bars F F there is attached a rope or chain, $i$, which passes upward through an eye or sheave, $j$, at the under side of the upper traverse-bar, $e$, of the uprights $b\,b$, and through other necessary eyes or sheaves, to give it a proper direction, to be attached to the end of the lever G when necessary to return the follower. The two pawls or hooks I I are connected by a spring, K, which has a tendency to keep the upper ends of the pawls or hooks in contact with the racks $d\,d$, as shown clearly in Fig. 2. To the windlass J and the outer end of lever G a rope, K, is attached. The rope K remains permanently attached to the lever G, unless when it is necessary to take up the slack created by stretching, which should always be done to prevent its slipping on the windlass. The rack and pawls must be so arranged that the last operation of the lever G will be a descending one, so that when the follower reaches its point of destination the end of the lever G will find itself depressed and brought nearly or quite in contact with the windlass. The pawls I I are now connected by the spring K, which keeps them in contact with and pressing against the bars F F, which carry the racks d d. The windlass is now turned first in one direction and then in the opposite, communicating a vibratory motion to the lever G, causing the pawls I I to engage alternately with the racks d d, and thus forcing down the follower in a vertical direction. When the follower has reached the destined point, the windlass D, to which the box B is attached, is turned so as to elevate it sufficiently to allow of cording and disengaging the bale. Now, to relieve the corded bale of the pressure, and to return the follower to the position necessary to recommence the process, the end of the rope, which is attached to the follower and passed through pulleys, as described, so as to give it the necessary direction, is attached by a hook, which it bears, to the lever G at the same point at which the other rope is attached, (see red lines, Fig. 2,) which draws the lever down, without, however, disengaging the latter. The windlass is then turned so as to elevate the end of the lever, (the spring K having been first disconnected,) which at one operation effects the object. When the box is again filled, the rope, which raises the follower and sustains during the process of filling the box, is cast off from the lever at the first depression thereof.

I am aware that pawls and racks have been previously used and arranged in various ways for the purpose of operating the follower of presses, and I do not claim such parts, separately considered; but I do claim as new and desire to secure by Letters Patent—

1. The combination of the rack-bars F F and the lever G, when the latter is provided with the pawls I I and the movable fulcrum-rods H H, arranged to operate as and for the purpose set forth.

2. The arrangement of the movable or sliding box B and follower rack-bars F F, operated, as shown, to admit of the exposure and consequent accessibility of the compressed article, for the purpose specified.

EDWARD C. BETTS.

Witnesses:
R. D. WILSON,
JOHN J. COLEMAN.